United States Patent
Bradley et al.

(10) Patent No.: US 7,290,027 B2
(45) Date of Patent: Oct. 30, 2007

(54) CIRCUIT SUITABLE FOR USE IN A CARRY LOOKAHEAD ADDER

(75) Inventors: Douglas Hooker Bradley, Austin, TX (US); Tai Anh Cao, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 403 days.

(21) Appl. No.: 10/059,554

(22) Filed: Jan. 30, 2002

(65) Prior Publication Data
US 2003/0145033 A1 Jul. 31, 2003

(51) Int. Cl.
G06F 7/50 (2006.01)
(52) U.S. Cl. ..................................... 708/710
(58) Field of Classification Search ......... 708/700–714
See application file for complete search history.

(56) References Cited

U.S. PATENT DOCUMENTS

| | | | | |
|---|---|---|---|---|
| 5,270,955 | A | * | 12/1993 | Bosshart et al. ............ 708/525 |
| 5,694,350 | A | * | 12/1997 | Wolrich et al. ............ 708/497 |
| 5,719,803 | A | * | 2/1998 | Naffziger ..................... 708/710 |
| 6,742,014 | B2 | * | 5/2004 | Bradley ....................... 708/710 |
| 6,769,007 | B2 | * | 7/2004 | Sutherland et al. ......... 708/700 |
| 2001/0037349 | A1 | * | 11/2001 | Hayakawa | |
| 2003/0074385 | A1 | * | 4/2003 | Liu | |
| 2004/0078417 | A1 | * | 4/2004 | Dubey et al. | |

\* cited by examiner

*Primary Examiner*—Chat C. Do
(74) *Attorney, Agent, or Firm*—Cas Salys; Anthony V. S. England

(57) ABSTRACT

An adder circuit for determining the sum of two operands including a set of PGK circuits, at least one tier of group circuits, and a carry generation circuit. The PGK circuits generate propagate, generate, and kill bits corresponding to at least a portion of the first and second operands. The group circuit receives propagate, generate, and kill bits from a plurality of the PGK circuits and produces a set of group propagate, generate, and kill values. The carry generation circuit receives a carry-in bit and the outputs of at least one of the group circuits and generates a carry-out bit representing the carry-out of the corresponding group. The PGK circuits, group circuits, and carry circuits may use CMOS transmission gates in lieu of conventional complementary pass-gate logic (CPL).

13 Claims, 10 Drawing Sheets

| C(i) | B(i) | A(i) | S(i) | P(i) | PC * | G(i) | K(i) | C(i+1) | C'(i+1) |
|---|---|---|---|---|---|---|---|---|---|
| 0 | 0 | 0 | 0 | 0 | 0 | 0 | 1 | 0 | 1 |
| 0 | 0 | 1 | 1 | 1 | 0 | 0 | 0 | 0 | 1 |
| 0 | 1 | 0 | 1 | 1 | 0 | 0 | 0 | 0 | 1 |
| 0 | 1 | 1 | 0 | 0 | 0 | 1 | 0 | 1 | 0 |
| 1 | 0 | 0 | 1 | 0 | 0 | 0 | 1 | 0 | 1 |
| 1 | 0 | 1 | 0 | 1 | 1 | 0 | 0 | 1 | 0 |
| 1 | 1 | 0 | 0 | 1 | 1 | 0 | 0 | 1 | 0 |
| 1 | 1 | 1 | 1 | 0 | 0 | 1 | 0 | 1 | 0 |

PC=P(i)C(i-1)

CARRY=A'BC+AB'C+ABC'+ABC
=C(A'B+AB')+AB(C'+C)
=C(A'B+AB')+AB
=PC+G
where P=A XOR B and G=AB CARRY' =A'B'C'+AB'C'+A'BC'+A'B'C
=A'B'(C'+C)+C'(AB'+A'B)
=A'B'+C'(AB'+A'B)
=PC'+K
where P=A XOR B and K=A'B'

CIRCUIT SUITABLE FOR USE IN A CARRY LOOKAHEAD ADDER

BACKGROUND

1. Field of the Present Invention

The present invention generally relates to the field of digital circuits and more particularly to an adder circuit that facilitates computations in an arithmetic unit of a microprocessor.

2. History of Related Art

Carry lookahead adders (CLA) are widely implemented in arithmetic units of microprocessors and other data processing devices. In a CLA, carry bits are computed algorithmically to reduce the propagation delay associated with a full n-bit adder in which determining the sum of high order bits must await the computation of low order carry bits. CLAs are more fully described in Hennessy & Patterson, *Computer Architecture A Quantitative Approach Second Edition*, Appendix A.8 (Morgan Kaufmann 1996) [hereinafter referred to as "Hennessy"].

In a CLA, the determination of the carry bit(s) is in the critical path. In other words, the performance of the adder is limited by the time required to generate the carry bit. In a conventional implementation, CLA circuits typically employ complementary pass-gate logic (CPL). In CPL design, logic gates are implemented with transistors of a single polarity (typically n-channel) while transistors of the opposite polarity may be used to reduce the circuit's static current.

Referring to FIG. 11, an exclusive-or (EXOR) circuit 10 is depicted as implemented with a conventional CPL design. Circuit 10 receives input signals "a" and "b" and their corresponding complements (indicated by the apostrophe mark). The "a" signal is connected to the gate electrodes of n-channel transistors 12 and 14 while the a' signal is connected to the gate electrodes of n-channel transistors 16 and 18. The "b" signal is connected to the source electrode of transistors 14 and 16 while the "b"' signal is connected to the source electrode of transistors 12 and 18. The drain terminals of transistors 12 and 16 are tied together at node 20 while the drain terminals of transistors 14 and 18 are tied together at node 22. It can be easily verified that node 20 is the exclusive-or (EXOR) of signals "a" and "b" while node 22 is the negated EXOR (EXNOR). CPL circuit 10 further includes cross-coupled p-channel transistors connected to nodes 20 and 22 to reduce static current by imposing a high impedance channel between the power supply and the logically low input signal.

When a logical "1" is passed through the source/drain of an n-channel transistor in a CPL circuit, a voltage of Vdd-Vtn is produced where Vdd is the supply voltage and Vtn is the n-channel threshold voltage. This passed voltage may be restored using an inverter having relatively weak p-channel device and a relatively strong n-channel device. The speed of a CPL circuit is strongly dependent on the "high" voltage that is applied to the gate of the n-channel device to turn it on. The higher the voltage applied at the gate, the harder the n-channel device is turned on and the lower the channel resistance. Reduced channel resistance translates into reduced RC delay. Moreover, a higher voltage applied at the gate translates into a higher output voltage produced at the output end of the circuit. The higher output voltage beneficially improves the ability of the inverter to generate a logical "0" because the Vgs of the inverter's n-channel device is larger. In summary, a higher "1" voltage results in a faster CPL circuit and, conversely, a lower "1" voltage implies a slower circuit. Unfortunately, CPL circuits are typically affected by a number of factors that can decrease the "1" voltage including coupling noise, delta-I noise, and DC voltage drop. Moreover, in silicon on insulator (SOI) devices, the voltage drop access the transistor tends to vary. This phenomenon is commonly referred to as the floating body effect or history effect and it can have a negative effect on the switching times of SOI devices. For these reasons, it is hard to model and predict the circuit speed. Scaling means applying successive generations of lower supply voltage process technology to the same circuit design. Unfortunately, scaling also means lower supply voltages, which reduce the speed of CPL circuits thereby making them less scalable.

Therefore it is highly desirable to implement a CLA in which the circuitry used to generate carry bits minimizes propagation delay without substantially increasing the cost or complexity of the circuit. It would be further desirable if the implemented circuit addressed the problems associated with conventional CPL circuitry, especially when implemented in an SOI technology.

SUMMARY OF THE INVENTION

The problems identified above are addressed by an adder circuit for determining the sum of two operands according to the present invention. The adder includes a set of PGK circuits, at least one tier of group circuits, and a carry generation circuit. The PGK circuits are configured to generate propagate, generate, and kill bits corresponding to at least a portion of the first and second operands. The group circuit receives propagate, generate, and kill bits from a plurality of the PGK circuits and produces a set of group propagate, generate, and kill values. The carry generation circuit receives a carry-in bit and the outputs of at least one of the group circuits and generates a carry-out bit representing the carry-out of the corresponding group. Each generate bit is the logical AND of its corresponding bits in the first and second operand while each propagate bit is the EXOR of its corresponding bits, and each kill bit is the logical NOR of its corresponding bits. At least one of the PGK circuits, group circuits, and carry circuits may be implemented with CMOS transmission gates in lieu of conventional complementary pass-gate logic (CPL). The PGK circuits and groups may further generate true and complement output signals substantially simultaneously.

BRIEF DESCRIPTION OF THE DRAWINGS

Other objects and advantages of the invention will become apparent upon reading the following detailed description and upon reference to the accompanying drawings in which.

Figures 1, 2A, 2B:
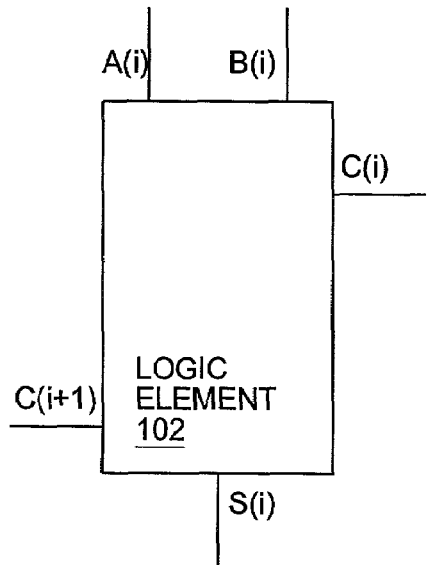
FIGS. 1, 2A, and 2B, are a circuit symbolic representation, truth table, and formulaic expression for determining the carry, propagate, generate, and kill bits in a carry lookahead adder.

While the invention is susceptible to various modifications and alternative forms, specific embodiments thereof are shown by way of example in the drawings and will herein be described in detail. It should be understood, however, that the drawings and detailed description presented herein are not intended to limit the invention to the particular embodiment disclosed, but on the contrary, the intention is to cover all modifications, equivalents, and alternatives falling within the spirit and scope of the present invention as defined by the appended claims.

DETAILED DESCRIPTION OF THE INVENTION

Generally speaking, the invention contemplates an adder for use in a data processing system. The adder is implemented primarily with CMOS transmission gate technology to achieve the required circuits while minimizing propagation delay. Alternative embodiments of the invention may, however, incorporate drive inverters at various stages of the circuitry to improve signal margins. The adder according to the present invention may incorporate mirror image circuitry to produce true and complement signals simultaneously to reduce propagation delay still further by eliminating the need for inverter circuits to produce signal complements.

Turning now to the drawings, FIG. 1, FIG. 2A, and FIG. 2B are a symbolic diagram, truth table, and formulaic expression respectively for a logic element 102. Logic element 102 provides a single bit adder useful in constructing a modified carry lookahead adder according to the present invention. Logic element 102, sometimes referred to as a carry-sum adder or 3:2 compressor, receives a single bit from a first operand A, a single bit (of equal significance) of a second operand B, and a carry-in bit (indicated as C(i)). Carry-sum adder 102 produces a sum bit and a carry-out bit based on the state of the inputs.

The truth table 120 of FIG. 2A indicates the states of the sum and carry-outputs for each possible state of the inputs. In addition, truth table 120 indicates values for a propagate variable (P), a generate variable (G), and a kill variable (K). Propagate and generate bits will be recognized by those familiar with carry lookahead adders. See, e.g., Hennessy and Patterson ibid Appendix A.8. The propagate bit P equals the exclusive-or (EXOR) of the input bits A and B. The generate bit (G) is the logical and (AND) of the input bits. The carry-out bit, Cout, the carry-in bit (Cin), the input bits, and the propagate and generate bits are related by the expression:

Cout=G OR (P)(Cin)

The kill variable (K) extends the propagate/generate paradigm and provides a quantity that is useful in expressing the logical complement of the carry-out bit. More specifically:

Cout'=K OR PCin' where K equals the logical NOR
of A and B (i.e., (NOT A) AND (NOT B)) and
the apostrophe symbol indicates the logical
complement.

In the present invention, propagate, generate, and kill bits are generated for each bit position such that, for a 64-bit adder, 64 P, G, and K bits are generated for each pair of input operands. These single-bit P, G, and K values are then used to create group P, G, and K bits. The group bits may be further combined in an additional layer of logic to achieve larger groups. In one embodiment, for example, the single bit P, G, and K values are combined in groups of 4 bits to create a set of sixteen 4-group P, G, and K bits. These sixteen 4-group bits are then recombined to generate a set of 16-group bits.

In one embodiment, the carry lookahead features of the adder are combined with carry select features to reduce adder complexity without substantially affecting performance. In this embodiment, a pair of sums may be generated for each 16-bit group of operands. A first sum represents the sum of the 16-bit grouping assuming that the carry bit into the group is 0. A second sum of the pair represents the sum of the 16-bit group assuming that the carry bit into the group 1. Meanwhile, 16-group P, G, and K bits are used to generate carry-in bits for each group. These group carry bits are used to select the appropriate sum from the pair of sums in each group. In this manner, an adder according to the present invention incorporates features of a carry select adder and a carry lookahead adder.

Figure 3:
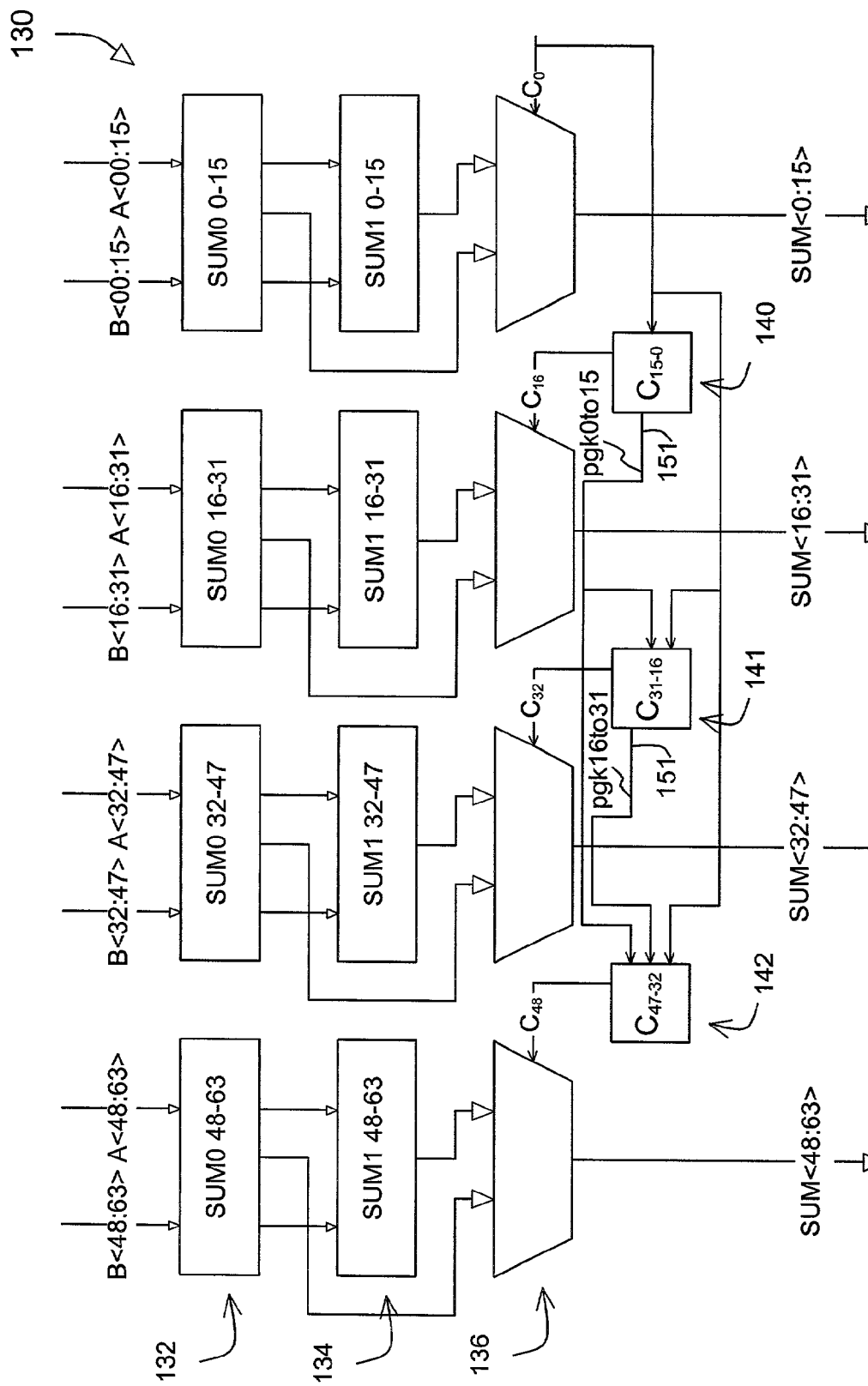
FIG. 3 is a diagram of an adder incorporating carry generation circuits according to one embodiment of the invention.

Turning now to FIG. 3, a block diagram of an adder 130 according to one embodiment of the invention is depicted. In the depicted embodiment, adder 130 includes a first set of sum circuits 132 and a second set of sum circuits 134. Each of the sum circuits 132 and 134 receives a portion of a first operand A and a portion of a second operand B. In the depicted embodiment of a 64-bit adder, the sum circuits are divided into four groups of full 16-bit adders. The first group receives bits 0 through 15 of the A and B operands, the second set receives bits 16 through 31, the third group receives bits 32 through 47, and the fourth group bits 48 through 63. The first set of sum circuits 132 is referred to as the sum 0 set because each of the adders in this group produces a 16-bit sum under the assumption that the carry bit into the 16-bit group is 0. The second set of sum circuit 134 is referred to as the sum 1 set because each of the adders in this group produces a 16-bit sum under the assumption that the carry bit into the group is 1.

The sums produced by first sum circuit set 132 and second sum circuit set 134 are provided to a corresponding set of multiplexers 136. The select signal provided to each multiplexer (except the low order multiplexer 136 corresponding to bits 0 through 15) is generated by a corresponding carry generation circuits 140, 141, and 142. The select signal provided to the low order multiplexer is the carry-in bit for the $0^{th}$ bit position, which is typically 0. Each of the carry generation circuits 140, 141, and 142 is configured to generate a carry bit indicative of a carry-out resulting from adding a portion of operand to a corresponding portion of operand B.

In the depicted embodiment, carry generation circuits 140, 141, and 142 each generate a group carry bit based upon the state of the operand bits in the corresponding group of 16 bits and the carry bit or carry bits that is carried into the group. The carry generation circuit 141 corresponding to the bit 16 through 31 group, for example, generates a carry signal based on operand A bits 16 through 31, operand B bits 16 through 31, the carry bit ($C_0$), and the carry bit ($C_{15}$) generated by the $C_{(15-0)}$ carry generation circuit 140. For the sake of clarity, the A and B operand bits that are received by carry generation circuits 140, 141, and 142 are not shown in FIG. 3.

Figure 4:
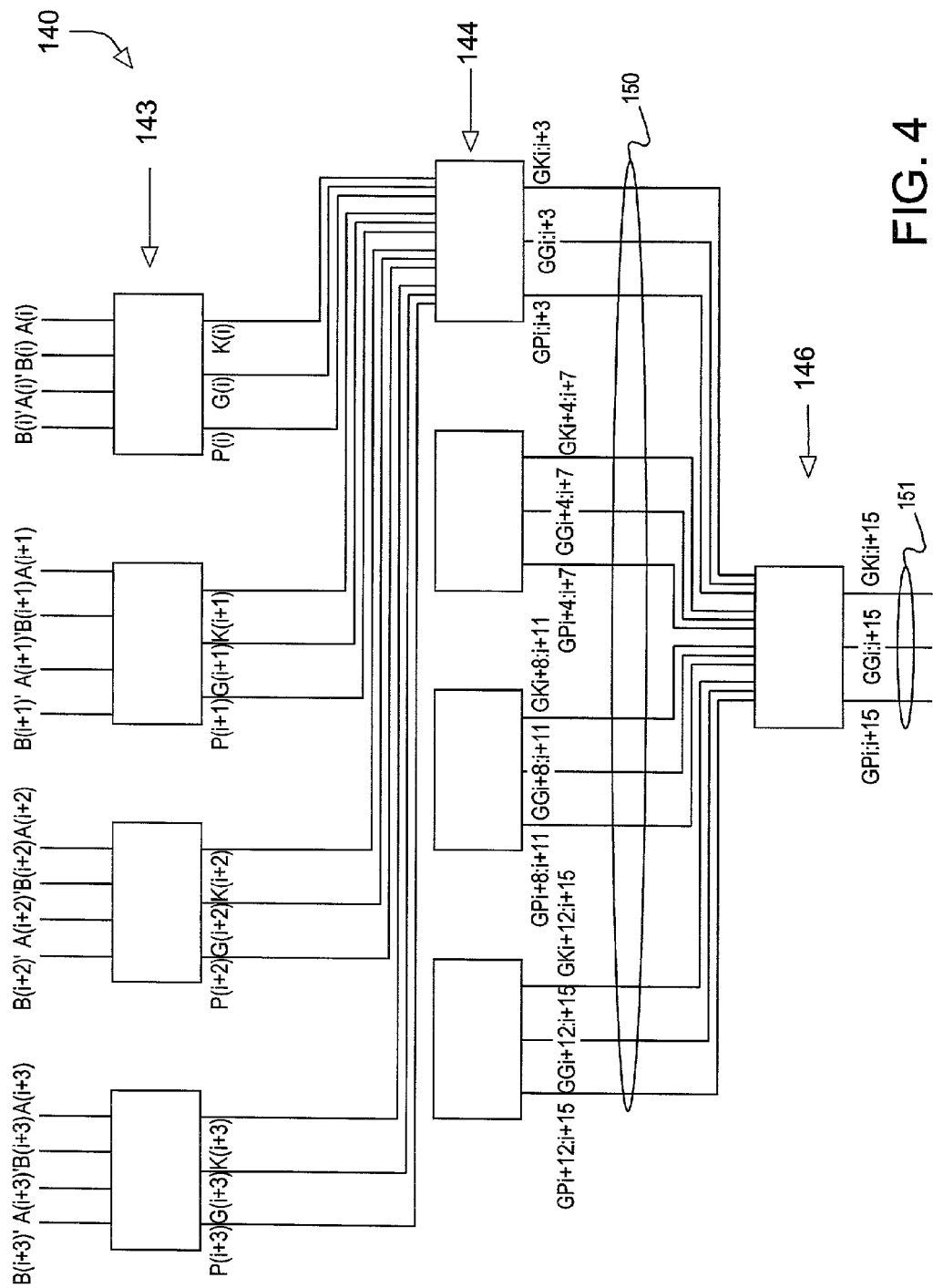
FIG. 4 is a block diagram of selected portions of the carry generation circuits of FIG. 3 circuit according to one embodiment of the invention.

Turning now to FIG. 4, a block diagram of selected elements of a carry generation circuit 140 according to one embodiment of the present invention is depicted. In the depicted embodiment, carry generation circuit 140 includes a set of PGK circuits 143, a set of group circuits 144, and a final group circuit 146. The PGK circuits 143 each receive a single bit of the A and B operands (and their logical complements). The number of PGK circuits 143 is equal to the number of bits in operands A and B. To simplify the drawing, only four of these circuits are shown. As their name implies, PGK circuits 143 are configured to calculate propagate, generate, and kill bits for each bit position in the operands. In one embodiment, each PGK circuit 143 is configured to simultaneously generate P, G, and K bits and their logical complements.

The single bit P, G, and K values generated by each PGK circuit 143 are provided to a set of group circuits 144. Group circuits 144 are configured to generate "group" P, G, and K values for a corresponding grouping of the operand bits. In the depicted example, each group circuit 144 receives the outputs from four adjacent PGK circuits 143 and produces group P, G, and K values for the 4-bit grouping. As will be familiar to those knowledgeable in carry lookahead adders as disclosed in Hennessy and others, group P, G, and K values are useful for determining the value of the carry-out bit of a particular bit position in terms of the carry-in bit to another bit position when the respective bit positions are not adjacent. As an example, if a particular 4-bit grouping is defined by the index values (i) to (i+3), the group P, G, and K values are used to express the carry bit ($c_{i+3}$) coming out of the group in terms of the carry bit coming out of the previous group ($c_{i-1}$).

The depicted embodiment of the present invention includes a two-tiered grouping architecture in which the first tier (represented by the set of group circuits 144) generates P, G, and K values for 4-bit groupings and the second tier (represented by the final group circuit 146) receives the set of 4-bit groupings the group circuits 144 and generates P, G, and K values for the corresponding 16-bit grouping. These 16-bit group P, G, and K values are used in conjunction with the carry-in bit to generate carry bit values for every 16the bit position as described more fully below with respect FIG. 8, FIG. 9, and FIG. 10. These carry bit values provide the select signals to respective multiplexers 136. It should be appreciated that while the depicted embodiment illustrates a 64-bit adder and a two-tiered P, G, and K grouping designed to generate four 16-bit groupings to accommodate the 4 sets of 16-bits full adders, other embodiments may employ more or fewer bits and more or fewer groupings.

Figure 5:
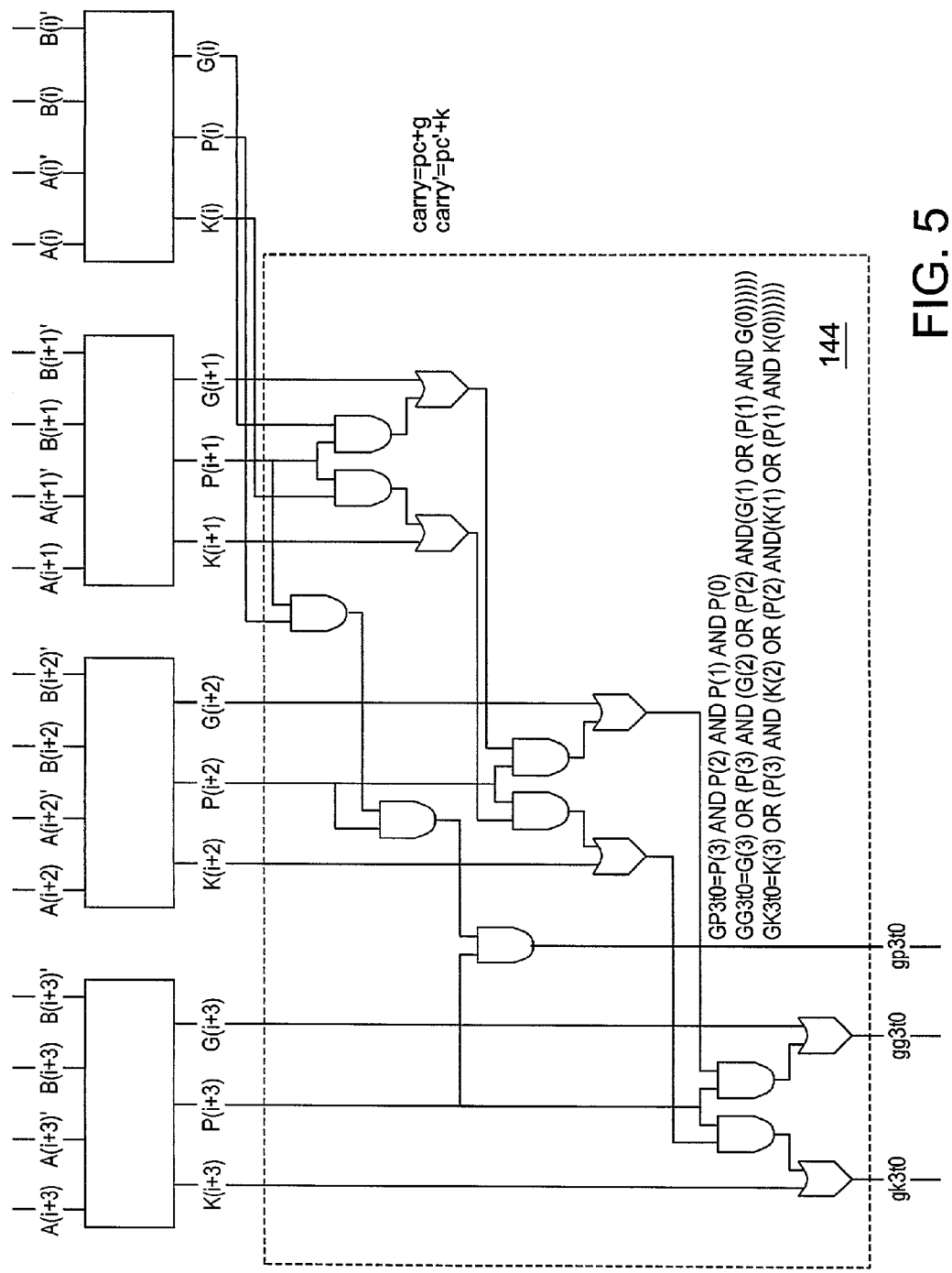
FIG. 5 is a logic diagram of selected portions of the carry generation circuits of FIG. 3 emphasizing the 4-bit group circuits according to one embodiment of the invention.

Turning now to FIG. 5, a logic block diagram of an exemplary group circuit 144 is depicted. Group circuit 144 receives P, G, and K values from each of four bit positions as generated by the set of PGK circuits 143. From these values, group circuit 144 calculates group P, G, and K values according to the equations shown in the figure when the index value "i" is equal to 0 and i+3 is equal to 3. Group circuit 144 includes sufficient combinational logic to produce the group values specified by the equations from the single bit P, G, and K values.

The present invention contemplates improved performance in the calculation of group values such as is done in group circuit 144. To achieve optimal performance in a limited amount of space, one embodiment of group circuit 144 is implemented exclusively with CMOS transmission gates and one buffer per output. The use of CMOS transmission gates in the preferred embodiment of group circuit 144 achieves optimal performance by minimizing gate delays associated with more conventionally implemented combinational logic cells such as conventional NAND, NOR, EXOR, and NXOR gates. In addition, because the CMOS transmission gates employed required only two transistors, the resulting design is beneficially compact. In one embodiment, the CMOS transmission gate architecture is extended to the single bit PGK circuits 143 as well to further improve performance and reduce the area required to implement the adder.

The transmission gates of the present invention must comply with certain basic requirements. For all logical input combinations, intermediate nodes inside the transmission gate circuit must never float. There must always be a path from each intermediate node to one of the inputs, which include ground and Vdd. Moreover, in steady state, the intermediate nodes cannot be driven by two conflicting circuits (i.e., driven by a logical "1" from one circuit and by logical "0" by another circuit). In addition, in cases where a gate is passing a constant "1," only the p-channel devices is needed while, in cases of passing a constant "0," only n-channel devices are needed.

Figure 6:
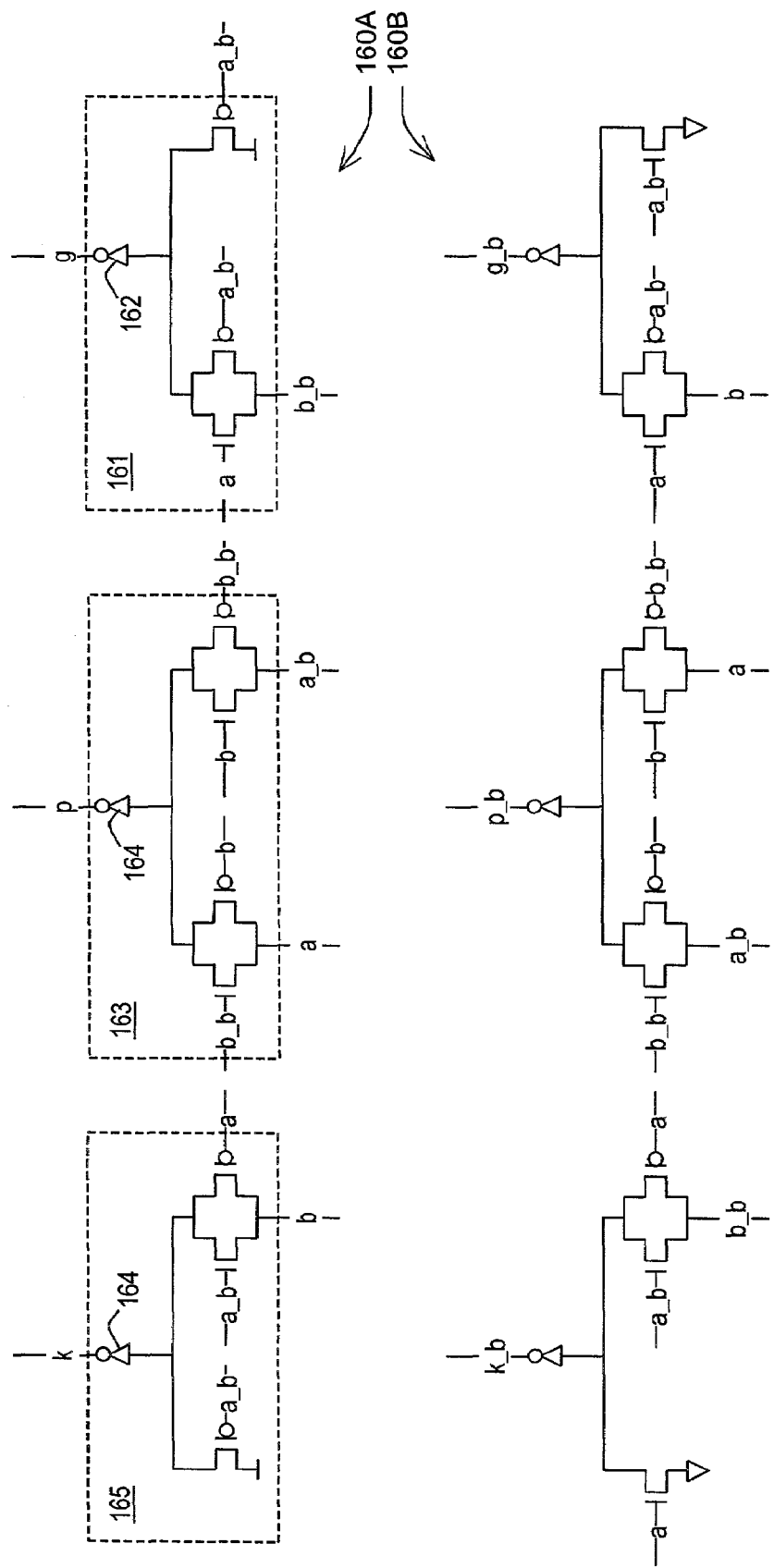
FIG. 6 is a circuit diagram of the PGK circuit portion of the carry generation circuits of FIG. 3 according to one embodiment of the invention.

Turning now to FIG. 6, a circuit diagram of an CMOS transmission gate implementation of PGK circuit 143 according to one embodiment of the present invention is depicted. The depicted embodiment of circuit 143 includes a true circuit 160A and a complement circuit 160B. Circuits 160A and 160B are similar in architecture. Because, however, the two circuits receive input values with opposite polarities, the two circuits produce logically complementary signals. True circuit 160A produces the P, G, and K bits for a given pair of A and B values while complement circuit 160B produces P', G', and K' values. Referring specifically to the true circuit 160A, the P, G, and K values are produced with a set of four CMOS transmission gates and a pair of MOS transistors. The G bit is generated by G circuit 161, which includes a CMOS transmission gate and an MOS transistor. In the depicted embodiment, the transmission gate of G circuit 161 receives the logical complement of the B operand bit as its transfer or input value. The transmission gate is controlled or gated by the A operand bit (with the A value being provided to the NMOS transistor and the complement of A being provided to the PMOS transistor). The logical complement of the A operand bit controls the stand-alone PMOS transistor. The drains of the stand-alone transistor and the transmission gate are tied together and are connected to the input of inverting buffer whose output is equal to G. When the A operand bit (denoted by the lower case a) is TRUE, the transmission gate is conductive and the complement of the B operand bit (denoted as b_b) is transferred to the common drain and inverted by buffer 162 to produce the G value. It will be apparent that G circuit 161 produces a G value of TRUE only when the A operand bit and B operand bit are TRUE.

True circuit 160A further includes a P circuit 163 that include a pair of CMOS transmission gates and an inverting buffer. A first transmission gate receives the A operand bit value (a) as its input and is gated by the logical complement of the B operand bit value (b_B). (For purposes of this disclosure, a transmission gate is said to be controlled by or gated by the signal connected to the NMOS transistor gate electrode). The second transmission gate is controlled by the B operand bit value (b) and receives the logical complement of the A operand bit value (a_b) as its input. The drains of the two transmission gates are tied together and connected to the input of an inverting buffer 164, whose output represents the P signal generated circuit 163. It can be confirmed that the depicted configuration produces a P value that is equal to the exclusive or (EXOR) of the A operand bit value and the B operand bit value.

Finally, true circuit 160A includes a K circuit 165 comprised of a transmission gate and a stand alone transistor which shares a common drain with the transmission gate. The common drain is connected to inverting buffer 164. The transmission gate receives the B operand bit value (b) as its input and is controlled by the complement of the A operand bit value (a_b). The stand-alone transistor is a PMOS transistor that is gated by the a_b signal. It can be confirmed that the output of the inverting buffer 164 is TRUE only when the A operand bit value and B operand bit value are both FALSE.

The depicted embodiment of PGK circuit 143 represents but one of multiple possible configurations. The polarity of various signals and transistors in the actual implementation may be reversed while still achieving the same result. If, for example, stand alone transistor in K circuit 165 is changed to an NMOS transistor, for example, the controlling signal could be changed to the TRUE value of the A operand bit without affecting functionality of the circuit. Typically, however, the present invention contemplates a design implementation that uses CMOS transmission gates exclusively to achieve the desired functionality (with the exception of stand-alone transistors where needed and inverting buffers at the outputs of the circuit to provide sufficient capacity for driving down-stream gates). The complementary circuit 160B is substantially equivalent to true circuit 160A, but inverts the polarity of transistors and inputs appropriately to achieve the logical complement of the P, G, and K values produce by true circuit 160A. Although these values could be derived by incorporating a CMOS inverter within circuits 161, 163, and 165 to produce true and complement signals, it will be appreciated that the addition of such an inverter would add an additional propagation delay to the time required to generate the true and complement forms of the signal. In contrast, the use of true and complement circuits 160A and 160B enables the simultaneous calculation of true and complement signals. In an embodiment, where space or die size is at a premium, the complement circuit can be eliminated in lieu of CMOS inverters incorporated onto the outputs of circuits 161, 163, and 165 at the penalty of an increased propagation delay.

Figure 7:
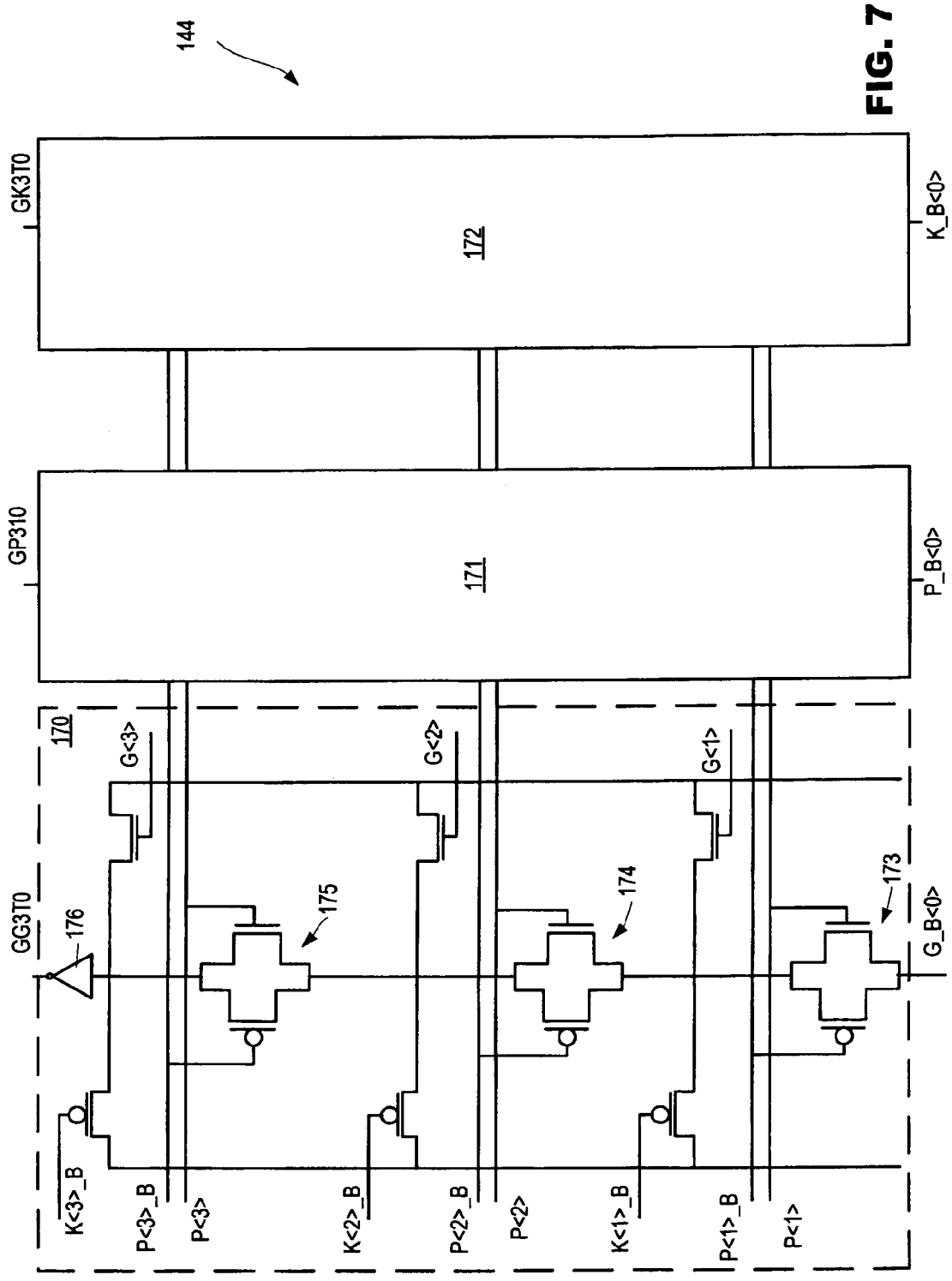
FIG. 7 is a circuit diagram of the group circuit of the carry generation circuits of FIG. 3 emphasizing the use of CMOS transmission gates.

Extending the CMOS transmission gate technology further, the combinational logic of group circuit 144 as depicted in FIG. 4 may be implemented with CMOS transmission gates in one embodiment of the invention. Referring now to FIG. 7, an embodiment of a group circuit 144 suitable for generating group P, G, and K values for a group of four bits is depicted. The outputs of four group circuits 144 may then be provided to final circuit 146 having substantially the same architecture as group circuit 144 to generate 16-bit group P, G, and K values. Because group circuit 144 and final circuit 146 have substantially identical architectures, the following discussion will focus on a group circuit 144 exclusively.

As depicted in FIG. 7, group circuit 144 includes a group G circuit 170, a group P circuit 171, and a group K circuit 172. Group G circuit 170 includes a series arrangement of three transmission gates 173, 174, and 175. Gate 173 receives an input signal g_b(0) representing the complement of the G signal in the 0th bit position and is gated by the p(1) signal resulting in an output that is TRUE only if g_b,(0) and p(1) are TRUE. The output node of transmission gate 173 is also connected to Vcc through an NMOS transistor gated by the g(1) signal and further connected to ground through a PMOS transistor gated by k_b(1). The NMOS transistor will force the output node of transmission gate 173 to TRUE if g(1) is TRUE while the PMOS transistor will force the output to FALSE if k(1) is TRUE. Thus, the output node of transmission gate 173 is TRUE if g_b(0) AND p(1) OR g(1) {note that g(1) TRUE and k_b(1) FALSE are mutually exclusive states}. Second transmission gate 174 and third transmission gate 175 perform functions for p(2) and p(3) respectively that are analogous to the function that first transmission gate 173 performs for p(1). The output node of each of the transmission gates is OR'd to Vcc through a NMOS transistor gated by the appropriate G bit according to the equations set forth in FIG. 4. In this manner, G circuit 171 calculates a group G value for bits 0 to 3 (or, by extension, for any other four bit grouping). The use of g_b(0) at the input inverts the result such that, after passing through inverting buffer 176, the appropriate polarity of G is achieved.

Transmission gates 173, 174, and 175 in Group G circuit 170 of group circuit 144 as depicted in FIG. 7 are connected in series with the source/drain terminals of one transmission gate connected to the source/drain terminals of the next. Group P circuit 171 and group K circuit 172 are similarly arranged. It will be appreciated that each transmission gate includes a small but finite voltage drop (Vds) from its source to its drain. In low voltage applications, this series of voltage drops across each transmission gates may undesirably result in reduced signal margins. Improved signal margins may be achieved by inserting one or more driver inverters into the circuit. Accordingly, one embodiment of group circuit 144 may include one or more inverters to improve signal margin in circuits 170, 171, and 172. As an example, an inverter may be included between transmission gates 173 and 174, or between gates 174 and 175, or both. Group P and Group K circuits 171 and 172 may also include such inverters.

One embodiment of the invention, referred to as a simultaneous dual-rail embodiment, contemplates the simultaneous generation of group P, G, and K bits and their logical complements. The simultaneous generation of true and complement signals beneficially improves performance by eliminating the need for a conventional inverter that would otherwise be required to generate complement signals. In the simultaneous dual-rail implementation, the portions of group circuit 144 depicted in FIG. 7 are duplicated. The duplicated circuit receives the logical complements of the signals received by group circuit 144 as depicted in FIG. 7. The complementary inputs result in complementary outputs thereby resulting in the simultaneous generation of the true and logical complement of each group signal.

If an inverter is included in circuits 170 through 172 to improve signal margins as described above, it will be appreacited that the polarity of the signal at the output of circuits 170 through 172 will flip. In a single-rail embodiment, in which signals of only a single polarity are generated, it would then be necessary to include a second inverter somewhere downstream, such as at the input of the next stage, to return the correct signal polarity. In a dual rail embodiment, however, the changed polarity caused by a signal margin inverter can be accommodated by appropriate routing of the signals. In other words, because a dual rail embodiment generates true and complement values for each signal, the inversion of the generated signals caused by a signal margin inverter requires only that the routing of the true and complement signals be reversed. Thus, the inclusion of signal margin inverters in a dual rail embodiment does not necessitate the inclusion of an additional inverter (and its corresponding delay) to restore the original polarity.

The 4-bit group P, G, and K signals generated by group circuit 144 as depicted in FIG. 7 are then received by a final circuit 146. As depicted in FIG. 4, final group circuit 146 receives the 4-bit group P, G, and K signals (collectively identified by reference numeral 150) from each of the group circuits 144 and produces 16-bit group P, G, and K signals 151 therefrom. Because final group circuit 146 is configured to group a set of four P, G, and K signals, it may be implemented with the same design configuration as each of the group circuits 144.

Figure 8:
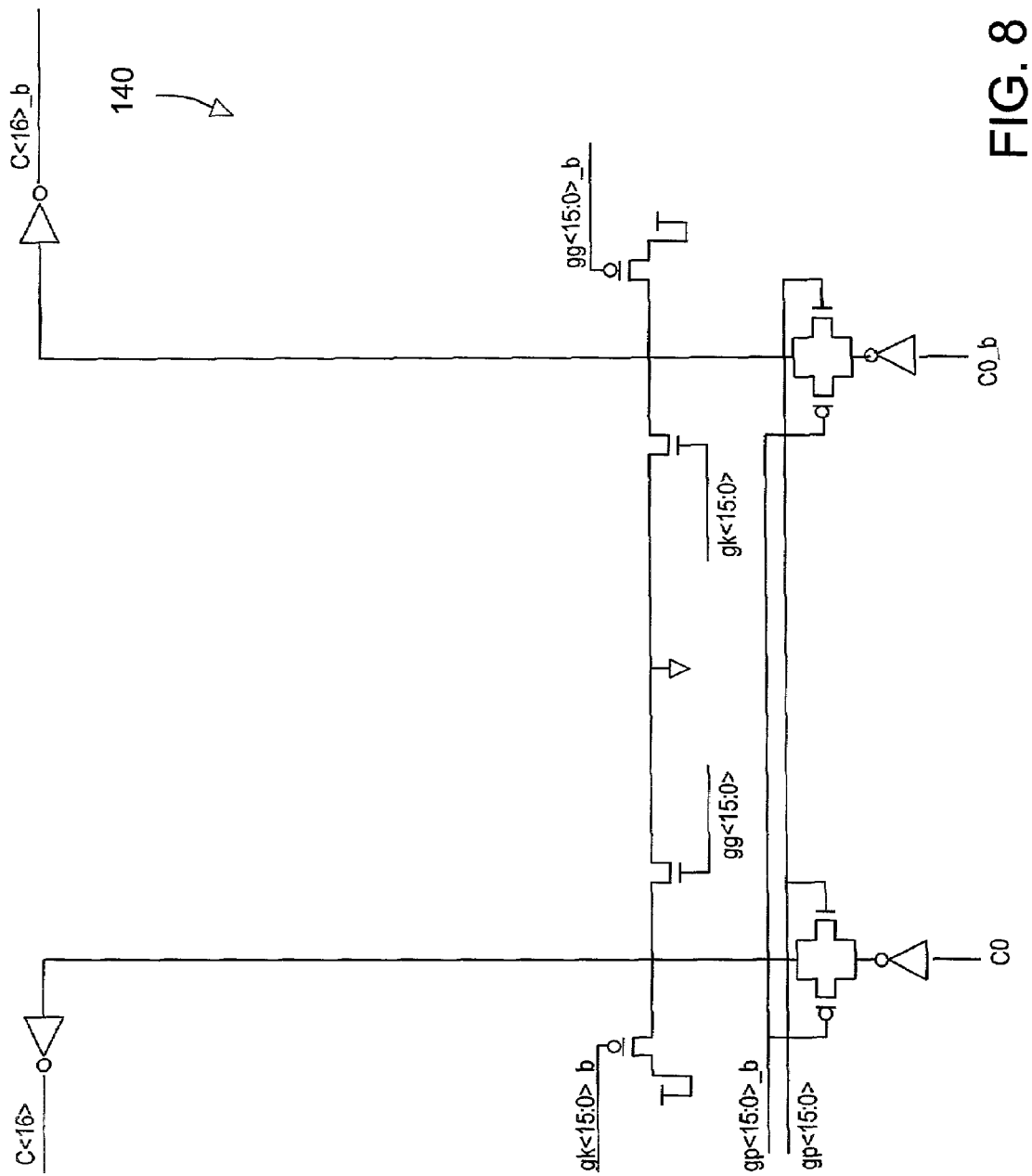
FIGS. 8, 9, and 10 are circuit diagrams of selected portions of the various carry generation circuits depicted in FIG. 3.
Figure 9:
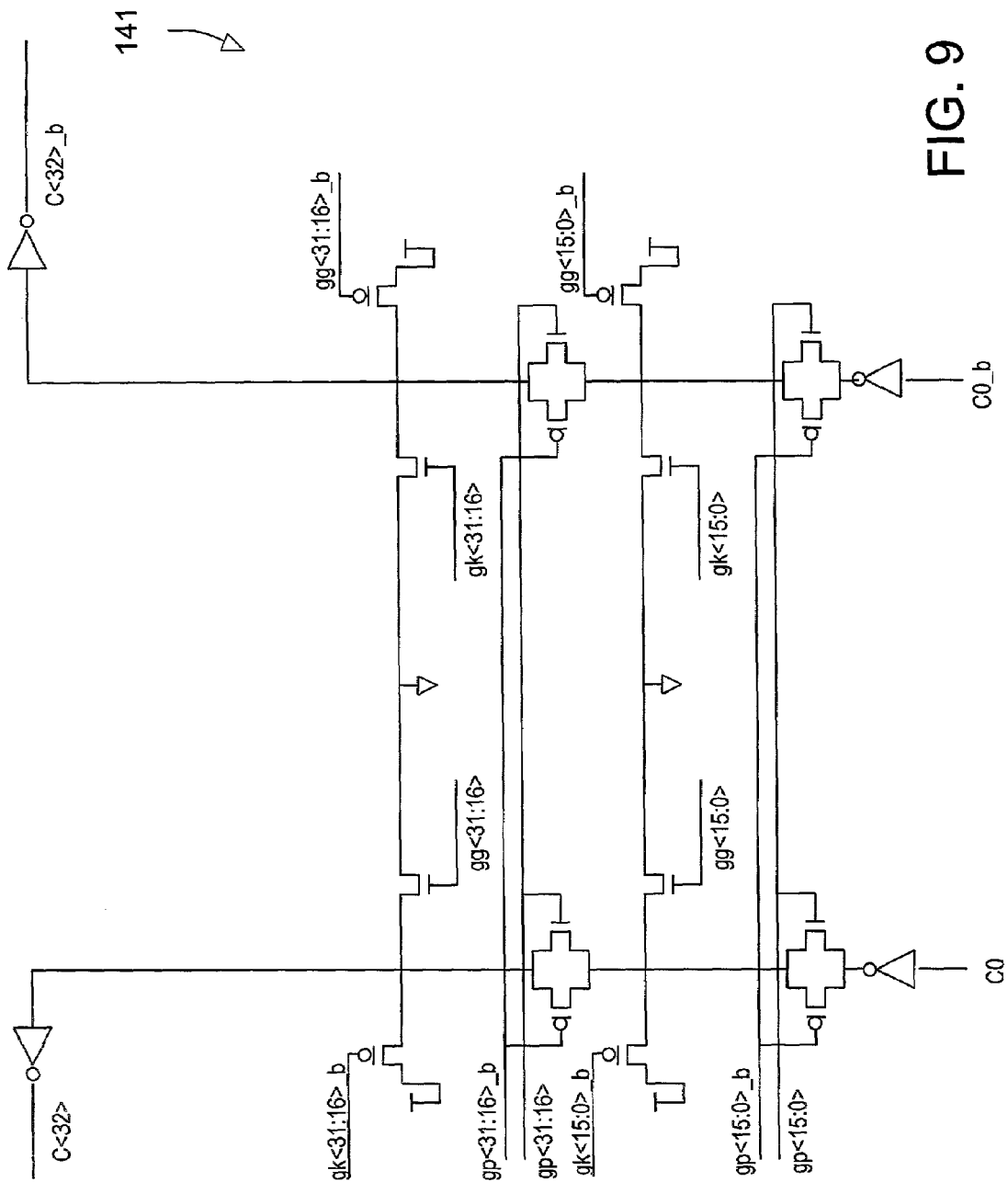
Figure 10:
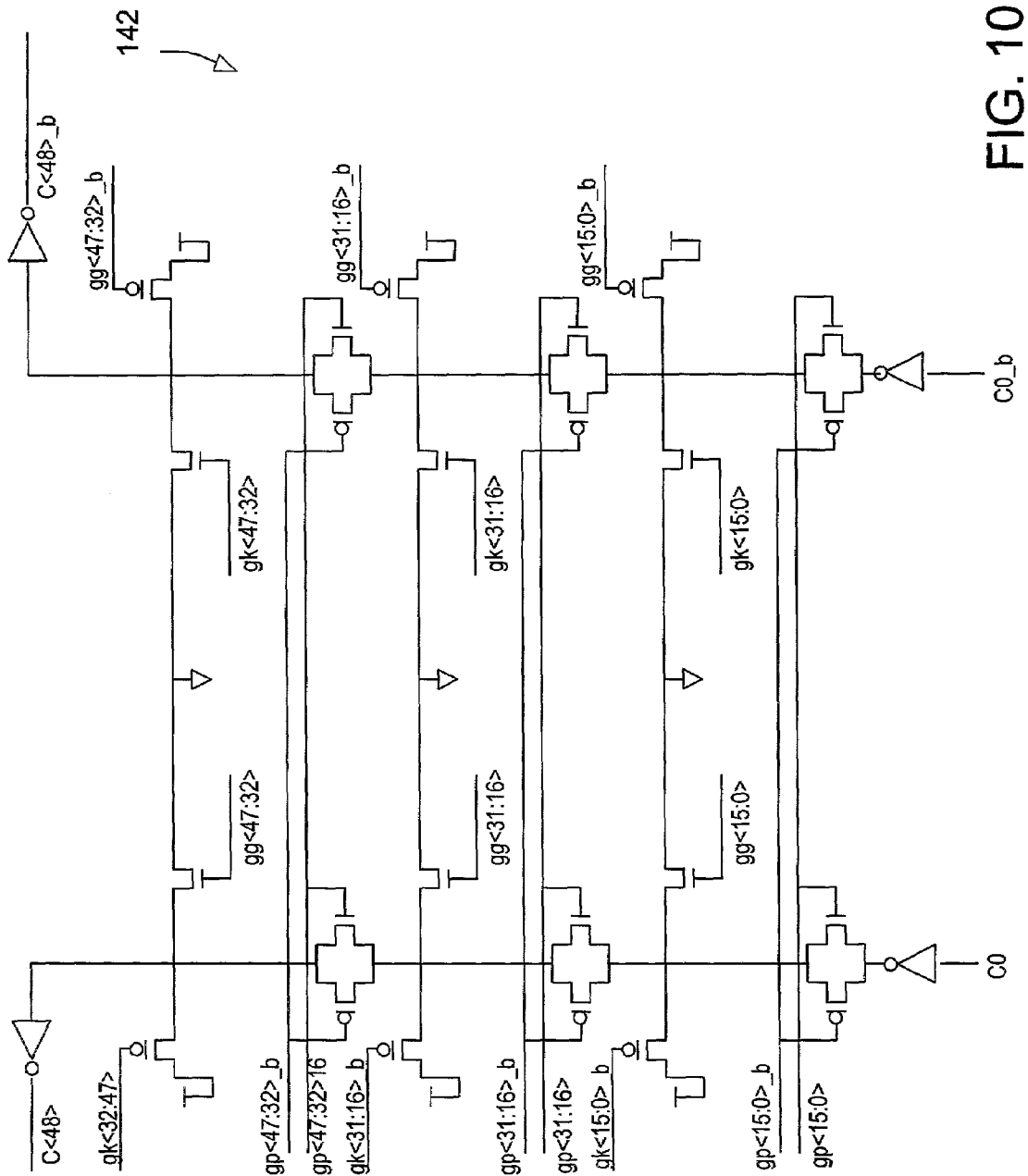
Figure 11:
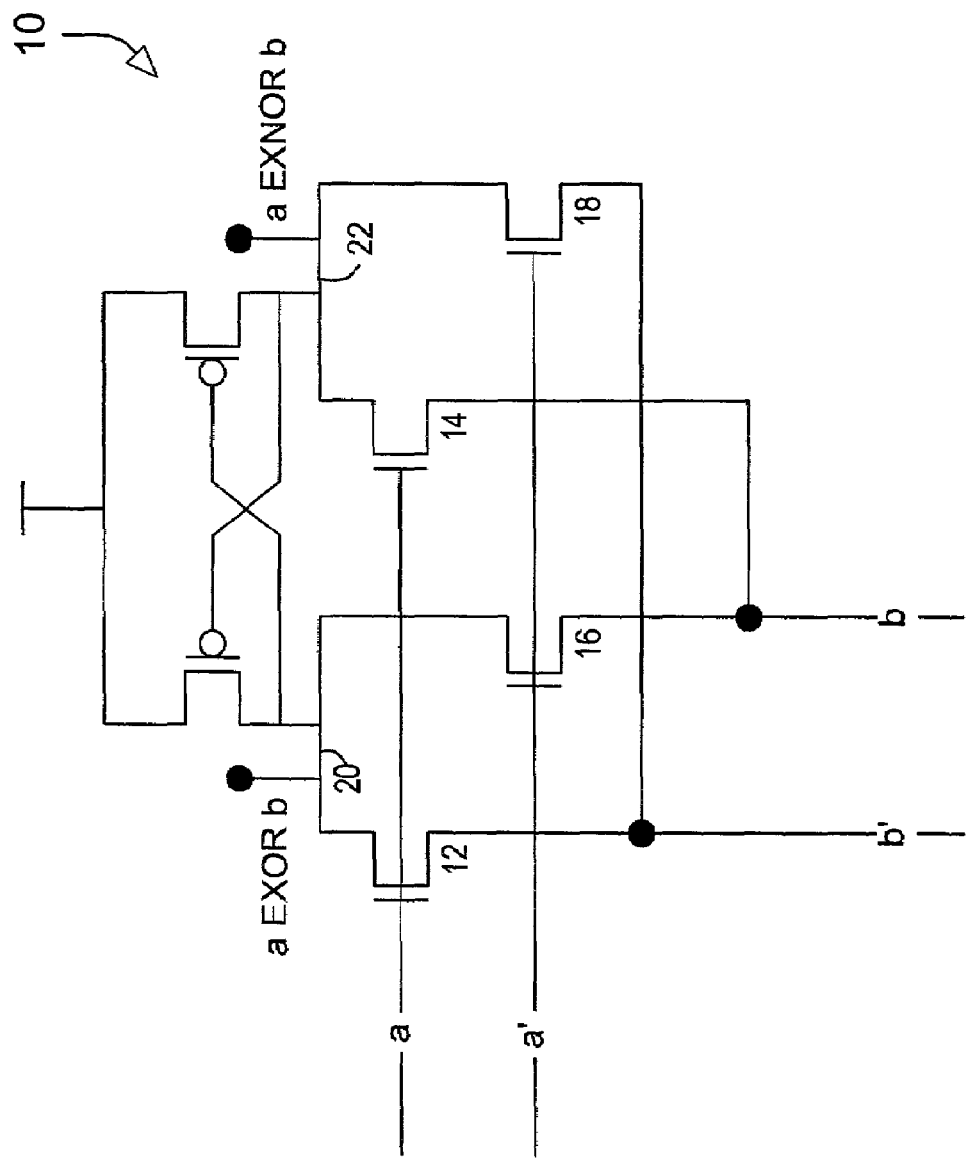
FIG. 11 is a circuit diagram of a complementary pass-gate logic (CPL) circuit according to the prior art.

The carry generation circuits 140, 141, and 142 of FIG. 3 use the 16-bit group P, G, and K signals 151 to generate group carry bits. More specifically, FIG. 8, FIG. 9, and FIG. 10 depict implementations of carry generation circuits 140, 141, and 142 respectively. Each of the circuits 140, 141, and 142, receives the $C_0$ bit as one of its inputs. In addition, carry generation circuit 141 corresponding to the bit 16 through 31 group, receives the 16-bit group P, G, and K signals 151 (and their complements) from carry generation circuit 140, which corresponds to the bit 0 through 15 group. Carry generation circuit 142, which corresponds to the bit 32 through 47 group, receives the P, G, and K signals 151 from carry generation circuit 140 and from carry generation circuit 141. In other words, the carry generation circuits generate carry bit values based on the least significant carry-in bit ($C_0$) as well as the P, G, and K signals generated by the carry generation circuits of less significant bit groups. FIG. 8, FIG. 9, and FIG. 10 depict transmission gate technology implementations for carry generation circuits 140, 141, and 142 respectively. Each carry generation circuit 140, 141, and 142 generates true and complement carry-out bit signals for the corresponding group of sixteen bits. These carry bit signals are provided to corresponding multiplexers 136 to select between the sum 0 and sum 1 outputs generated by sum circuits 132 and 134.

It will be apparent to those skilled in the art having the benefit of this disclosure that the present invention contemplates the use of a carry lookahead adder that uses transmission gate circuits and inverter circuits to minimize propagation delay and improve the performance of an arithmetic unit in which the adder is used. It is understood that the form of the invention shown and described in the detailed description and the drawings are to be taken merely as presently preferred examples. It is intended that the following claims be interpreted broadly to embrace all the variations of the preferred embodiments disclosed.

What is claimed is:

1. A microprocessor including an adder circuit for determining the sum of two operands, the adder comprising:
    a set of PGK circuits configured to generate propagate, generate, and kill bits corresponding to at least a portion of the first and second operands;
    at least one tier of group circuits configured to receive the propagate, generate, and kill bits from a plurality of the PGK circuits and to produce, in response thereto, a set of group propagate, generate, and kill values;
    a carry generation circuit configured to receive a carry-in bit and the outputs of at least one of the group circuits and further configured to generate a carry-out bit representing the carry-out of the corresponding group; and
    a select circuit configured to select between a first sum and a second sum responsive to the carry-out bit
    wherein at least one of the PGK circuits, group circuits, and carry circuits includes at least one complementary metal oxide semiconductor transmission gate;
    wherein the complementary metal oxide semiconductor transmission circuit comprises a PMOS transistor and an NMOS transistor, wherein a first source/drain terminal of the PMOS transistor is connected to a first source/drain terminal of the NMOS transistor and
    wherein a second source/drain terminal of the PMOS transistor is connected to a second source/drain terminal of the NMOS transistor; and
    wherein a gate terminal of the PMOS transistor is driven by a first signal and a gate terminal of the NMOS transistor is driven by the logical complement of the first signal.

2. The microprocessor of claim 1, wherein each generate bit is the logical AND of its corresponding bits in the first and second operand, each propagate bit is the EXOR of its corresponding bits in the first and second operands, and each kill bit is the logical NOR of its corresponding bits in the first and second operands.

3. The microprocessor of claim 1, wherein the PGK circuits further generate the logical complements of the propagate, generate, and kill bits substantially simultaneously with the generation of the propagate, generate, and kill bits.

4. The microprocessor of claim 3, wherein the group circuits further generate the logical complements of the group propagate, generate, and kill values substantially simultaneously with the generation of the group propagate, generate, and kill values.

5. The microprocessor of claim 1, wherein the at least one tier of group circuits includes a first tier of group circuits configured to receive the output of the PGK circuits and to generate an intermediate set of group propagate, generate, and kill values, and a second tier of at least one group circuit configured to receive the intermediate set of group propagate, generate, and kill values and to produce a final group propagate, generate, and kill values.

6. The microprocessor of claim 5, wherein the intermediate group of propagate, generate, and kill values each corresponds to a group of four adjacent bits and further wherein the final group of propagate, generate, and kill values correspond to a group of 16 adjacent bits.

7. An adder circuit for determining the sum of two operands, comprising:
    a set of PGK circuits configured to generate propagate, generate, and kill bits corresponding to at least a portion of the first and second operands;
    at least one tier of group circuits configured to receive the propagate, generate, and kill bits from a plurality of the PGK circuits and to produce, in response thereto, a set of group propagate, generate, and kill values;
    a carry generation circuit configured to receive a carry-in bit and the outputs of at least one of the group circuits and further configured to generate a carry-out bit representing the carry-out of the corresponding group; and
    a select circuit configured to select between a first sum and a second sum responsive to the carry-out bit;
    wherein at least one of the PGK circuits, group circuits, and carry circuits includes at least one complementary metal oxide semiconductor transmission gate;
    wherein the complementary metal oxide semiconductor transmission circuit comprises a PMOS transistor and an NMOS transistor, wherein a first source/drain terminal of the PMOS transistor is connected to a first source/drain terminal of the NMOS transistor and wherein a second source/drain terminal of the PMOS transistor is connected to a second source/drain terminal of the NMOS transistor; and wherein a gate terminal of the PMOS transistor is driven by a first signal and a gate terminal of the NMOS transistor is driven by the logical complement of the first signal.

8. The adder circuit of claim 7, wherein each generate bit is the logical AND of its corresponding bits in the first and second operand, each propagate bit is the EXOR of its corresponding bits in the first and second operands, and each kill bits is the logical NOR of its corresponding bits in the first and second operands.

9. The adder circuit of claim 7, wherein the at least one tier of group circuits includes a first tier of group circuits configured to receive the output of the PGK circuits and to generate an intermediate set of group propagate, generate, and kill values, and a second tier of at least one group circuit configured to receive the intermediate set of group propagate, generate, and kill values and to produce a final group propagate, generate, and kill values.

10. The adder circuit of claim 9, wherein the intermediate group of propagate, generate, and kill values each corresponds to a group of four adjacent bits and further wherein the final group of propagate, generate, and kill values correspond to a group of 16 adjacent bits.

11. The adder circuit of claim 7, wherein at least one of the PGK circuits includes a propagate circuit having a first complementary metal oxide semiconductor transmission gate receiving a first input signal that is gated by the inverse of a second input signal and a second complementary metal oxide semiconductor transmission gate receiving an inverse of the first input signal that is gated by the second input signal.

12. The adder circuit of claim 7, wherein a group circuit includes a group generate circuit, a group propagate circuit, and a group kill circuit, each comprising a plurality of complementary metal oxide semiconductor transmission gates connected in series with source/drain terminals of a first transmission gate connected to source/drain terminals of the next.

13. The adder circuit of claim 12, wherein each transmission gate is controlled by one of the propagate bits.

* * * * *